(12) United States Patent
León

(10) Patent No.: US 11,661,918 B2
(45) Date of Patent: May 30, 2023

(54) NOISE REDUCER FOR A WIND TURBINE ROTOR BLADE

(71) Applicant: LM Wind Power A/S, Kolding (DK)

(72) Inventor: Carlos Arce León, Kolding (DK)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 17/430,215

(22) PCT Filed: Feb. 17, 2020

(86) PCT No.: PCT/EP2020/054119
§ 371 (c)(1),
(2) Date: Aug. 11, 2021

(87) PCT Pub. No.: WO2020/169540
PCT Pub. Date: Aug. 27, 2020

(65) Prior Publication Data
US 2022/0163012 A1    May 26, 2022

(30) Foreign Application Priority Data

Feb. 18, 2019 (EP) ..................... 19157644

(51) Int. Cl.
*F03D 7/02* (2006.01)
*F03D 1/06* (2006.01)

(52) U.S. Cl.
CPC ......... *F03D 7/0296* (2013.01); *F03D 1/0633* (2013.01); *F03D 1/0675* (2013.01); *F05B 2240/3042* (2020.08); *F05B 2260/96* (2013.01)

(58) Field of Classification Search
CPC ...... F05B 2240/3062; F05B 2240/3042; F03D 1/0675; F03D 1/0633
See application file for complete search history.

(56) References Cited

U.S. PATENT DOCUMENTS 5,533,865 A * 7/1996 Dassen ................. F03D 1/0608
                                                              244/200.1
9,670,901 B2 * 6/2017 Obrecht ................ F03D 1/0675
(Continued)

FOREIGN PATENT DOCUMENTS

EP    2921697 A1    9/2015
EP    3348826 A1    7/2018

OTHER PUBLICATIONS

International Search Report dated Apr. 20, 2020 for application No. PCT/EP2020/054119.
(Continued)

*Primary Examiner* — David E Sosnowski
*Assistant Examiner* — Arthur Paul Golik
(74) *Attorney, Agent, or Firm* — Nath, Goldberg & Meyer; Jerald L. Meyer; Tanya E. Harkins

(57) ABSTRACT

The present invention relates to a wind turbine rotor blade assembly comprising a rotor blade and a noise reducer (70) configured on the rotor blade. The noise reducer (70) comprises a plurality of aligned spine members (72), each spine member having a length and comprising a first section (74) extending along a first part of the length of the spine member, and a second section (76) extending along a second part of the length of the spine member, wherein the first section (74) has a higher stiffness than the second section (76).

15 Claims, 5 Drawing Sheets

(56) References Cited

U.S. PATENT DOCUMENTS

| | | | |
|---|---|---|---|
| 10,259,562 B2* | 4/2019 | Beckman | B64C 11/20 |
| 10,746,157 B2* | 8/2020 | Wang | F03D 1/0633 |
| 11,181,093 B2* | 11/2021 | Asheim | F03D 1/0633 |
| 2008/0166241 A1* | 7/2008 | Herr | F04D 29/38 |
| | | | 416/241 R |
| 2012/0134837 A1 | 5/2012 | Drobietz et al. | |
| 2015/0198141 A1* | 7/2015 | Hayden | F01D 5/28 |
| | | | 416/212 R |
| 2017/0276117 A1* | 9/2017 | Church | B64C 11/14 |
| 2018/0347540 A1* | 12/2018 | Hurault | F03D 1/0675 |

OTHER PUBLICATIONS

European Search Report dated Aug. 19, 2019 for application No. EP 19157644.6.

* cited by examiner

NOISE REDUCER FOR A WIND TURBINE ROTOR BLADE

This is a National Phase Application filed under 35 U.S.C. 371 as a national stage of PCT/EP2020/054119, filed Feb. 17, 2020, an application claiming the benefit of European Patent Application No. 19157644.6, filed Feb. 18, 2019, the content of each of which is hereby incorporated by reference in its entirety.

FIELD OF THE INVENTION

The present invention relates to a wind turbine rotor blade assembly comprising a rotor blade and a noise reducer. In another aspect, the present invention relates to a wind turbine comprising a wind turbine rotor blade assembly according to the present invention.

BACKGROUND OF THE INVENTION

Wind power is increasingly popular due to its clean and environmentally friendly production of energy. The rotor blades of modern wind turbines capture kinetic wind energy by using sophisticated blade design created to maximise efficiency. However, one of the obstacles to wide-spread acceptance of wind power technology is the creation of aerodynamic noise emitted from the wind turbine blades. Aerodynamic noise often originates from the interaction of turbulence with the trailing edge of the rotor blade. Hence, noise reducing devices and associated blade designs are increasingly desired.

To this end, modern wind turbine blades are sometimes provided with serrations along the blade trailing edges, in an effort to reduce blade trailing edge noise and/or to improve wind turbine blade efficiency, as can be seen in EP1314885. While the noise mitigating properties of such serrations are advantageous, several drawbacks remain. Often, finding the right serration geometry is a trade-off between noise mitigation performance and structural requirements. This may lead to the need for thick trailing edge regions, especially near the serration base. This increased thickness can be a source of additional noise.

Other noise-reducing components such as bristles, combs or spines may be attached to the trailing edge of the rotor blade to reduce the noise and increase the efficiency associated with the rotor blades. Some systems combine these or other features with serrations. For example, WO 2016/184619 A1 relates to a rotor blade comprising serrations along a portion of the trailing edge, wherein an area between adjacent serrations is at least partially filled with a porous material.

However, many of such known systems do not efficiently prevent noise generation if the direction and/or speed of air flow varies. Also, some prior art devices offer noise reduction benefits, but are only effective within a narrow operating range.

It is therefore an object of the invention to provide a wind turbine blade having an improved trailing edge configuration and/or comprising an improved noise reducer.

It is another object of the invention to provide a wind turbine blade design having noise reducing features, which improve noise reduction within a broad range of operating conditions.

It is another object of the invention to provide a wind turbine blade design having noise reducing features, which are cost-efficient, yet structurally stable.

It is another object of the invention to provide a wind turbine blade design having noise reducing features which are easy to manufacture and to install.

SUMMARY OF THE INVENTION

The present inventors have found that one or more of the above-described objects can be achieved by a wind turbine rotor blade assembly comprising a rotor blade having exterior surfaces defining a pressure side, a suction side, a leading edge and a trailing edge, each of the pressure side, the suction side, the leading edge and the trailing edge extending between a tip end and a root end, the rotor blade defining a span and a chord, a noise reducer configured on the rotor blade, the noise reducer comprising a plurality of aligned spine members, each spine member having a length and comprising a first section extending along a first part of the length of the spine member, and a second section extending along a second part of the length of the spine member, wherein the first section has a higher stiffness than the second section.

The blade assembly of the present invention is found to offer noise reduction benefits, in particular with respect to extending the operating range of the noise reducer. Contrary to known devices with a more limited operating window, the blade assembly of the present invention can be used over a broader range of wind speeds, allowing effective noise reduction even at high wind speeds. It may also increase the efficiency associated with the rotor blade. In addition, the noise reducer of the present invention can be easily manufactured and arranged on wind turbine blades.

Preferably, the noise reducer of the present invention is attached adjacent the trailing edge of the rotor blades. In some embodiments, the spine members, or part thereof, extend from the trailing edge of the blade into an airflow behind the trailing edge. In other embodiments, the noise reducer may be configured on a surface of the rotor blade adjacent the leading edge of the rotor blade, or adjacent the tip or the root of the rotor blade. In some embodiments, the noise reducer is provided as a panel for mounting on the wind turbine blade. Preferably, such panel comprises a mounting surface or a mounting plate for attaching the panel to the rotor blade.

The spine members are preferably elongate members, i.e. members having a length dimension that is at least three, five, ten or twenty times higher than its two other dimensions, i.e. height and width, or diameter. The spine members may take the form of rods or filaments, at least along part of their length. In a preferred embodiment, the second section of a spine member is substantially cone-shaped. It is thus preferred that the spine members taper towards their respective distal ends.

The total length of the spine members may be at least 50 mm, or at least 100 mm. The diameter of a spine member may decrease towards its distal end. Preferably, the spine members are aligned in parallel fashion, such that adjacent spine members extend substantially in parallel to each other. In some embodiments, there is a substantially constant spanwise distance between the respective distal ends of the spine members. Typically, the spine members will be arranged substantially perpendicular to a spanwise direction or orientation of the rotor blade.

Each spine member preferably comprises a first section extending along a first part of the length of the spine member, the first section preferably having a circular or elliptical cross section. The first section is preferably a middle section of the spine member. A second section extends along a second part of the length of the spine member, preferably adjacent to the first section, preferably including the distal end of the spine member, i.e. the downstream end with respect to air flow, during normal use and installation. Each spine member may further comprise a third section, preferably adjacent to the first section, which preferably comprises the opposing, proximal end of the spine member. The third section may have a semi-circular or semi-elliptical cross section. Thus, in a preferred embodiment, each spine member comprises a proximal end and a distal end, wherein the second section includes the distal end.

The noise reducer may comprise at least 10, such as at least 20 or at least 50 spine members, preferably aligned in parallel to each other. In a preferred embodiment, the length of individual spine members varies across the noise reducer, preferably across a spanwise direction. In some embodiments, the longest spine member of the noise reducer is at least twice as long as the shortest spine member of the noise reducer.

It is preferred that the first section of the spine member has a higher stiffness than the second section. In some embodiments, the first section, and optionally the third section of the spine member, is made from a material having a higher stiffness than the material constituting the second section.

In a preferred embodiment, the second section of the spine member is formed from a material having a modulus of elasticity of 1 GPa or less, preferably 0.1 GPa or less. In some embodiments, the second section has an elastic modulus (Young's modulus) of between 0.01 and 110 GPa, preferably 0.01-70 GPa, such as between 0.01-45 GPa or between 0.01-10 GPa, preferably 0.01-1 GPa. The second section may be made from a material comprising rubber or another polymer material.

In exemplary embodiments, the first section, and optionally the third section, of the spine member is formed from a material having a modulus of elasticity of greater than or equal to approximately 2.5 GPa, greater than or equal to approximately 5 GPa, greater than or equal to approximately 10 GPa, greater than or equal to approximately 20 GPa greater than or equal to approximately 30 GPa, greater than or equal to approximately 40 GPa, greater than or equal to approximately 50 GPa, greater than or equal to approximately 100 GPa, or greater than or equal to approximately 200 GPa. In some embodiments, the proximal section of the member is formed from a material having a modulus of elasticity of up to approximately 200 GPa.

In some embodiments, the respective second sections are movable upwards and/or downwards with respect to the respective first sections. Thus, an angle may be formed between the surface defined by the respective first sections of the spline members and the second sections of the spline members, for example in response to air flow over the noise reducer.

In some embodiments, a surface defined by the spline members, or part thereof, such as a surface constituted by adjacent respective first sections, is oriented substantially parallel to the blade chord. Thus, said surface and the blade surface lie in planes, which are either parallel or arranged at an angle of not more than 15°, preferably not more than 10°, to each other. In other embodiments, the surface defined by the spline members, or part thereof, such as the respective first sections, may be provided at an angle relative to the blade chord.

According to another embodiment, the first section of the spine member is adjacent to the second section of the spine member such that an interface is formed between the first section and the second section. The interface may have a circular shape. In one embodiment, the chordwise or airflow-wise location of the interface varies between different spine members of the noise reducer. Thus, the distance between the proximal end of the spline member and the interface may vary between different spine members of the noise reducer. For example, for one spine member, the interface may be located further away from its distal end, or further downstream with respect to the direction of airflow, as compared to the interface of an adjacent spine member.

In a preferred embodiment, the respective interfaces of the plurality of spine members are arranged along an undulated, spanwise extending path across the noise reducer. Advantageously, the interfaces of the plurality of spine members are arranged along a sawtooth-shaped, or rounded sawtooth-shaped, spanwise extending path across the noise reducer.

In a preferred embodiment, the plurality of spine members collectively forms a plurality of serrations, or a substantially serrated noise reducer. It is thus preferred that the noise reducer has a serrated shape. For example, 15-25 spine members may form one serration. The one or more serrations may be achieved by varying the respective lengths of the spine members such that a plurality of serrations is formed. For example, the apex or tip end of a serration can be formed by one or two spline members.

According to a preferred embodiment, said serrations are arranged at incidence to the flow over the wind turbine blade, i.e. at an angle to the flow direction over the blade at the trailing edge of the blade. In one aspect, said serrations are angled towards the pressure side of the wind turbine blade. Preferably, said serrations are angled to the flow direction over the wind turbine blade at an angle of between 0-45 degrees to the flow direction, preferably between 1-25 degrees. This may advantageous increase the lift of the blade.

According to another embodiment, the spine members have a circular or elliptical cross section at least along part of their length, such as throughout their first section and/or second section.

In a preferred embodiment, a diameter or thickness of the spine members decreases from the first section to the second section. It is particularly preferred that the diameter or thickness of the spine member in its second section decreases gradually from the interface between the first section and the second section towards to the distal end of the spine member. Preferably, the distal end of the spine member is a substantially sharp or acute tip.

The diameter of the first section of the spine members may be, for example, less than or equal to 20 mm, preferably less than or equal to 10 mm. The diameter of the first section of the spine members may be at least 2 mm, preferably at least 5 mm.

Preferably, a diameter or thickness of the first section is higher than a diameter or thickness of the second section.

According to another embodiment, adjacent spine members are connected along at least part of their respective first sections, preferably along their entire respective first sections. Preferably, adjacent spine members are connected along their entire respective first sections and their entire respective third section. It is also preferred that the second sections including the respective distal end of the spine members are not connected or attached to the respective first sections of adjacent spine members.

In a preferred embodiment, the connected spine members form a ribbed or undulated surface, such as a ribbed or undulated top surface and/or a ribbed or undulated bottom surface. Typically, the air will flow over said ribbed or undulated top surface.

According to another embodiment, the spine members are hollow on the inside. In other embodiments, the spine members are solid or filled on the inside. The spine members may advantageously be obtainable by 3D-printing, extrusion or injection moulding.

In a preferred embodiment, the length of the first section is at least as long as the flow boundary layer thickness during operation of the rotor blade. It is preferred that the length of the first section is at least 2 mm, preferably at least 5 mm, most preferably at least 10 mm.

According to another embodiment, the length of the second section does not exceed the flow boundary layer thickness during operation of the rotor blade. Preferably, the length of the second section of the spine members is not more than 10 mm, preferably not more than 5 mm.

In a preferred embodiment, the length of the second section is at least 10% of the flow boundary layer thickness during operation of the rotor blade.

In some embodiments, the spine member further comprises a third section extending along a third part of the length of the spine member and including the proximal end of the spine member, wherein the respective third sections of the aligned spine members form a mounting plate for mounting of the noise reducer to the rotor blade. Thus, the noise reducer of the present invention may be attached to the rotor blade by using the respective third sections of the spine members, which preferably have a semi-circular cross section, Preferably, at top surface of the respective third sections is straight, thus defining a substantially planar top surface as part of the mounting plate.

In another aspect, the present invention relates to a wind turbine comprising a wind turbine rotor blade assembly according to the present invention.

In yet another aspect, the present invention relates to a panel for a wind turbine rotor blade, wherein the panel is configured for attachment to the rotor blade, preferably to a trailing edge thereof, the panel comprising a plurality of aligned spine members, each spine member having a length and comprising a first section extending along a first part of the length of the spine member, and a second section extending along a second part of the length of the spine member, wherein the first section has a higher stiffness than the second section.

Preferably the panel further comprises a mounting plate or support structure for arranging the panel on a wind turbine rotor blade. The spine members of the panel may be arranged to form a serrated structure. All embodiments or features described above with respect to the blade arrangement and noise reducer of the present invention apply likewise to the panel of the present invention, In another aspect, the present invention relates to a wind turbine rotor blade assembly comprising a rotor blade having exterior surfaces defining a pressure side, a suction side, a leading edge and a trailing edge, each of the pressure side, the suction side, the leading edge and the trailing edge extending between a tip end and a root end, the rotor blade defining a span and a chord, a noise reducer configured on the rotor blade, the noise reducer comprising a plurality of aligned spine members, each spine member having a length and comprising a first section extending along a first part of the length of the spine member, and a second section extending along a second part of the length of the spine member, wherein adjacent spine members are connected along at least part of their respective first sections, preferably along their entire respective first sections, and wherein adjacent spine members are not connected along their respective second sections. Thus, the connected first sections will provide a relatively rigid or stiff structure followed by a more flexible structure of free second sections of the spine members. Each spine member may comprise a proximal end and a distal end, wherein the second section includes the distal end. The second section may be substantially cone-shaped. The first section of the spine member may have a cylindrical shape. The third section of the spine member may have a half-cylinder shape.

The first section is preferably adjacent to the second section such that an interface is formed between the first section and the second sections. The chordwise location of the interface may vary between different spine members of the noise reducer. In some embodiments, the interfaces of the plurality of spine members are arranged along an undulated, spanwise extending path across the noise reducer. The spine members of the noise reducer may be arranged to form a serrated structure. Similarly, embodiments or features described above with respect to other aspects of the present invention apply likewise to this aspect.

The skilled reader will understand that the elastic modulus, also known as Young's modulus, defines the relationship between stress (force per unit area) and strain (proportional deformation) in a material. Thus, the elastic modulus is a measure of the stiffness of a material. The elastic modulus can be determined by the cantilever beam test, as is well known in the art.

As used herein, the term "proximal" refers to an upstream location with respect to airflow over the spine members or the noise reducer which, during normal use and installation, is closest to the leading edge of the blade. The proximal end will usually be mounted to, or arranged on, the wind turbine blade. By contrast, the term "distal" refers to a downstream location with respect to airflow over the spine members or the noise reducer that, during normal use and installation, is further downstream with respect to air flow and further away from the leading edge of the blade.

DETAILED DESCRIPTION OF THE INVENTION

Embodiments of the invention will now be described, by way of example only, with reference to the accompanying drawings, in which:

FIG. 1 shows a wind turbine;

It will be understood that elements common to the different embodiments of the invention have been provided with the same reference numerals in the drawings.

Figure 1:
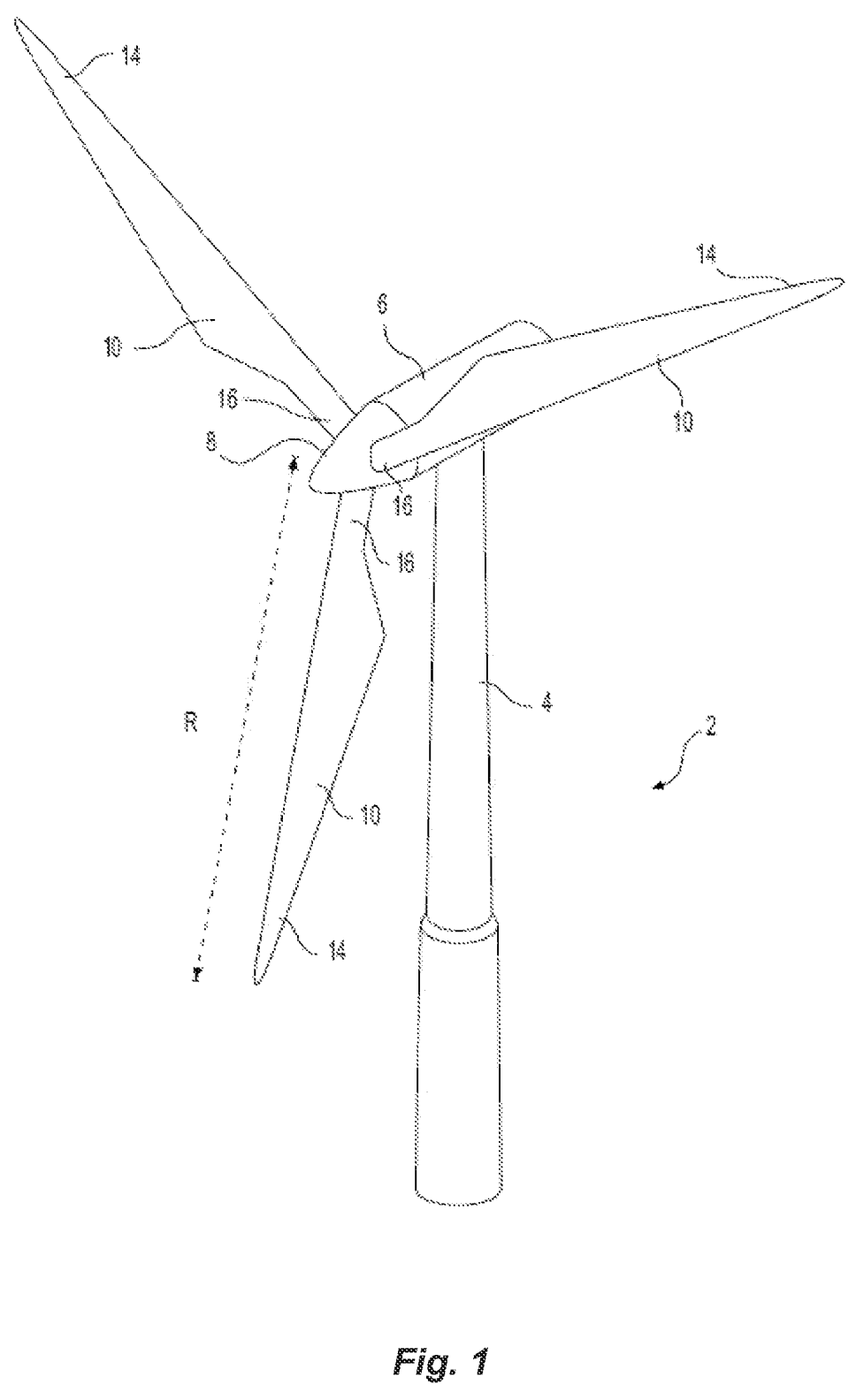
Figure 2:
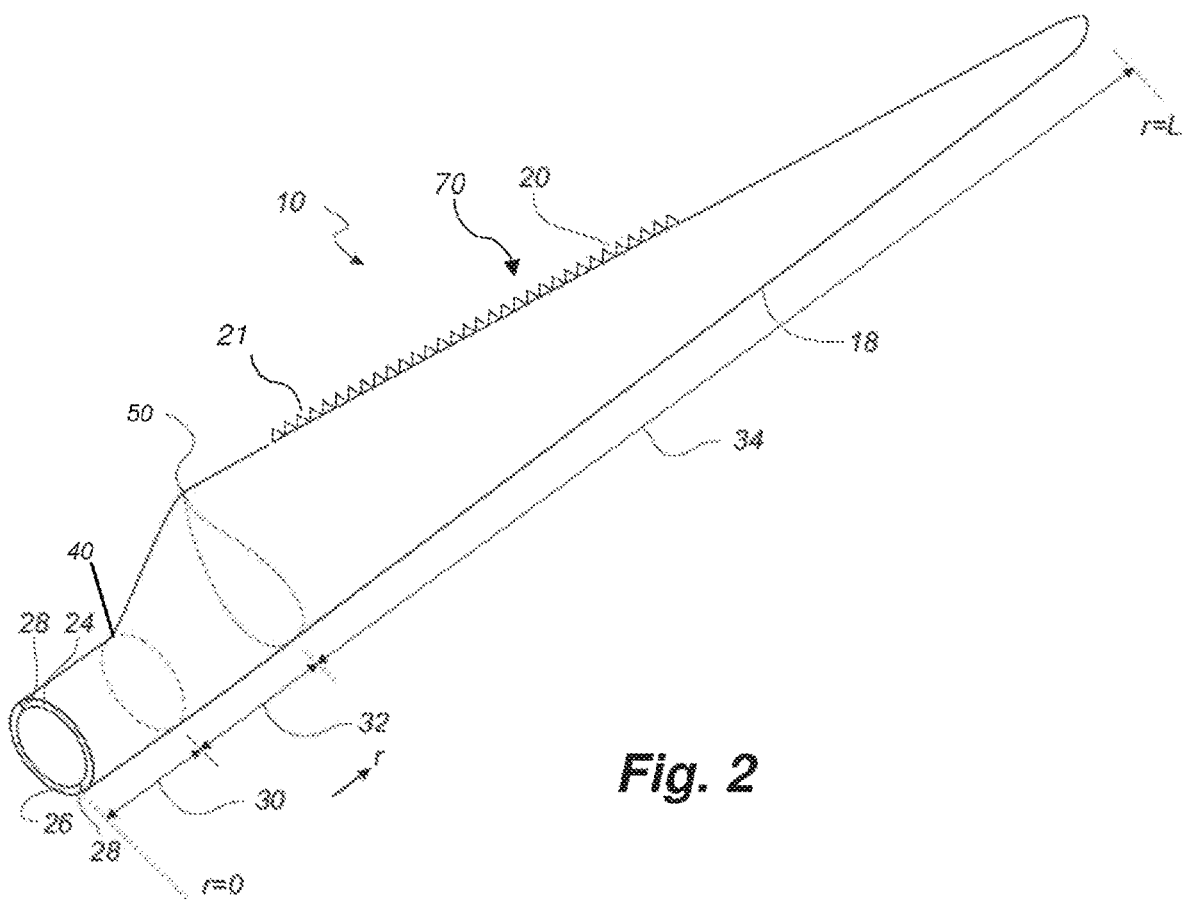
FIG. 2 shows a schematic view of a wind turbine blade according to the invention.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8, the blade extending in a spanwise direction between the root 16 and the tip 14. The rotor has a radius denoted R.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18. A noise reducer 70 in the form of an array of trailing edge serrations 21 is provided along a portion of the trailing edge 20 of the blade. In general, flow of air over the wind turbine blade 10 extends from the leading edge 18 to the trailing edge 20 in a generally transverse or chordwise direction. While the noise reducer 70 in FIG. 2 is depicted as being arranged along a middle portion of the blade, it is recognised that the noise reducer may be arranged for instance closer to the tip of the blade 10, or that it may be arranged along for instance the entire airfoil region 34 of the blade 10.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
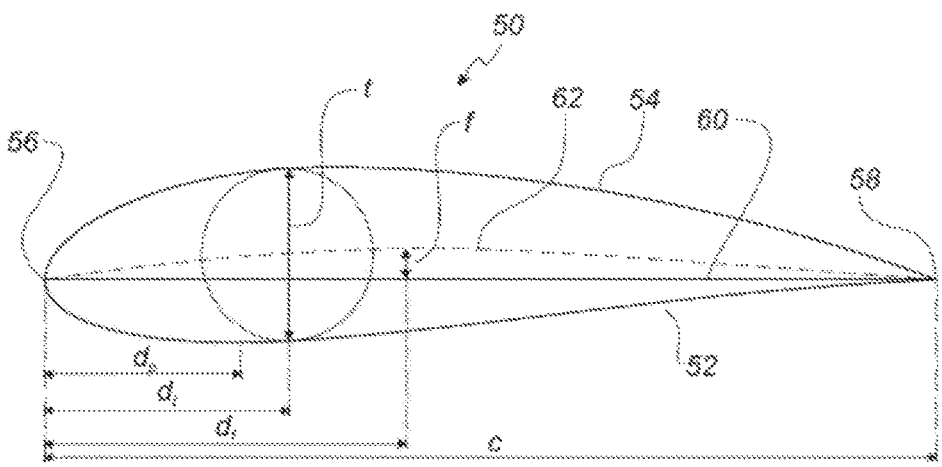
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58, The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

Figure 4:
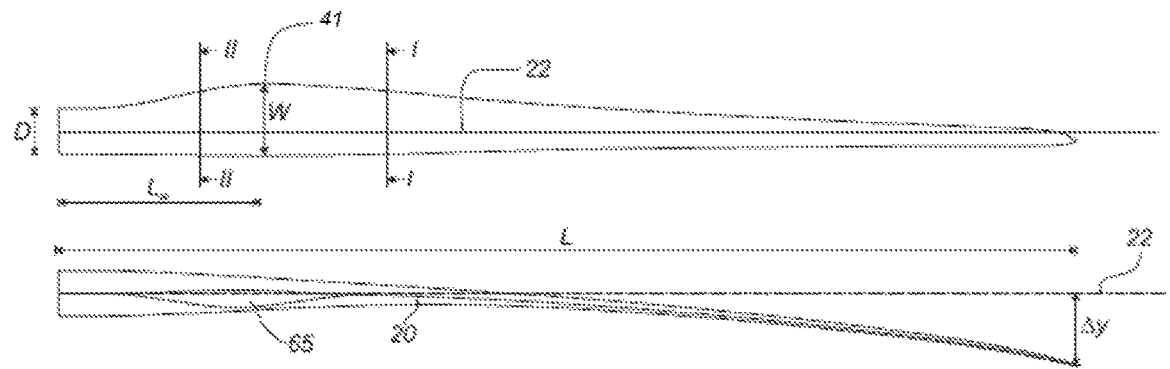
FIG. 4 shows a schematic view of the wind turbine blade of FIG. 2, seen from above and from the side.

FIG. 4 shows sonic other geometric parameters of the blade. The blade has a total blade length L. As shown in FIG. 2, the root end is located at position r=0, and the tip end located at r=L. The shoulder 41 of the blade is located at a position r=$L_w$, and has a shoulder width W, which equals the chord length at the shoulder 41. The diameter of the root is defined as D. Further, the blade is provided with a pre-bend, which is defined as Δy, which corresponds to the out of plane deflection from a pitch axis 22 of the blade.

The wind turbine blade 10 generally comprises a shell made of fibre-reinforced polymer, and is typically made as a pressure side or upwind shell part 24 and a suction side or downwind shell part 26 that are glued together along bond lines 28 extending along the trailing edge 20 and the leading edge 18 of the blade 10. Wind turbine blades are generally formed from fibre-reinforced plastics material, e.g. glass fibres and/or carbon fibres which are arranged in a mould and cured with a resin to form a solid structure. Modern wind turbine blades can often be in excess of 30 or 40 metres in length, having blade root diameters of several metres. Wind turbine blades are generally designed for relatively long lifetimes and to withstand considerable structural and dynamic loading.

Figure 5:
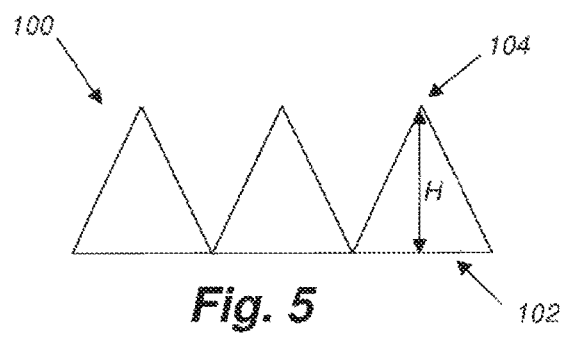
FIG. 5 illustrates a set of trailing edge serrations.

With reference to FIG. 5, an enlarged view of a plurality of prior art serrations 100 of the serrated trailing edge 21 are shown. The serrations 100 comprise a base end 102 which is arranged at the trailing edge 20 of the wind turbine blade 10, and a tip end 104 which extends downwind of the blade trailing edge 20. A notional line extending from a midpoint of the base 102 to the apex or tip end 104 defines a height H of the serration. The illustrated serrations are substantially planar, but it will be understood that the serrations may vary in depth or thickness, in particular having tapered or chamfered edges. The serrations 100 are shown as having a profile substantially corresponding to an isosceles triangle, but it will be understood that other serration shape profiles may be used, e.g. curved, wave-shaped profiles, or crenulated edges.

Figure 6:
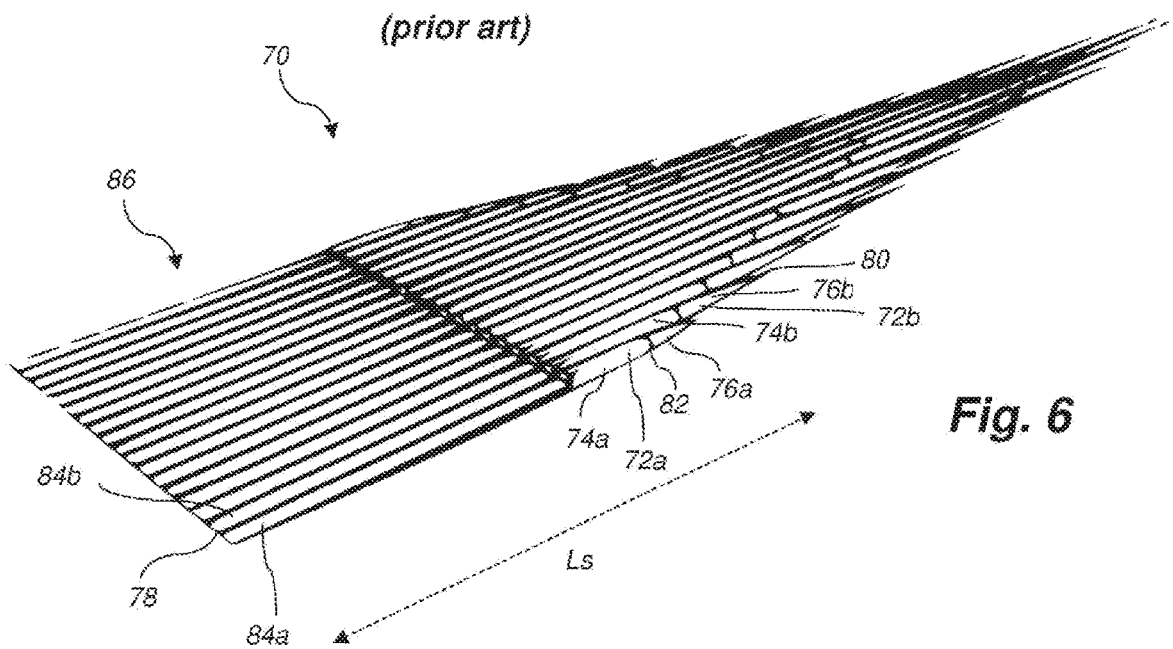
FIG. 6 is a partial perspective view of a noise reducer according to one embodiment of the present invention.

FIG. 6 is a partial perspective view of a noise reducer 70 according to one embodiment of the present invention. The noise reducer 70 comprises a plurality of aligned spine members 72a, 72b, each spine member having a length Ls, as illustrated for spine member 72a. Each spine member comprises a first section 74a, 74b extending along a first part of the length of the spine member 72a, 72b, and a second section 76a, 76b extending along a second part of the length of the spine member, wherein the first section 74a, 74b has a higher stiffness than the second section.

Figure 8:
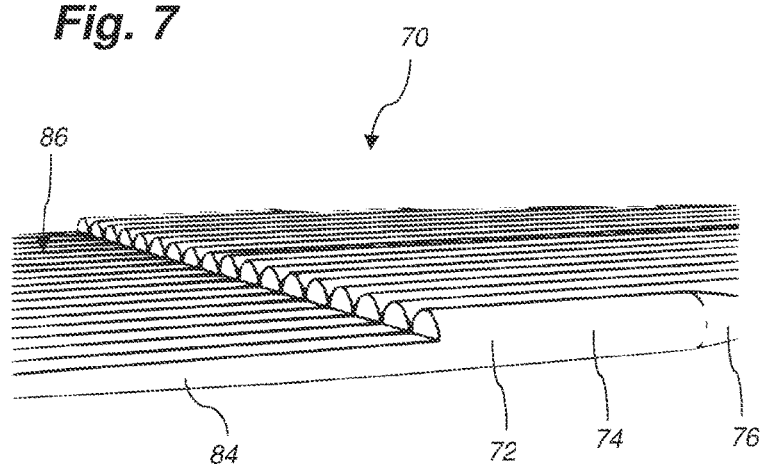
FIG. 8 is a partial perspective view of a noise reducer according to one embodiment of the present invention.
Figure 9:
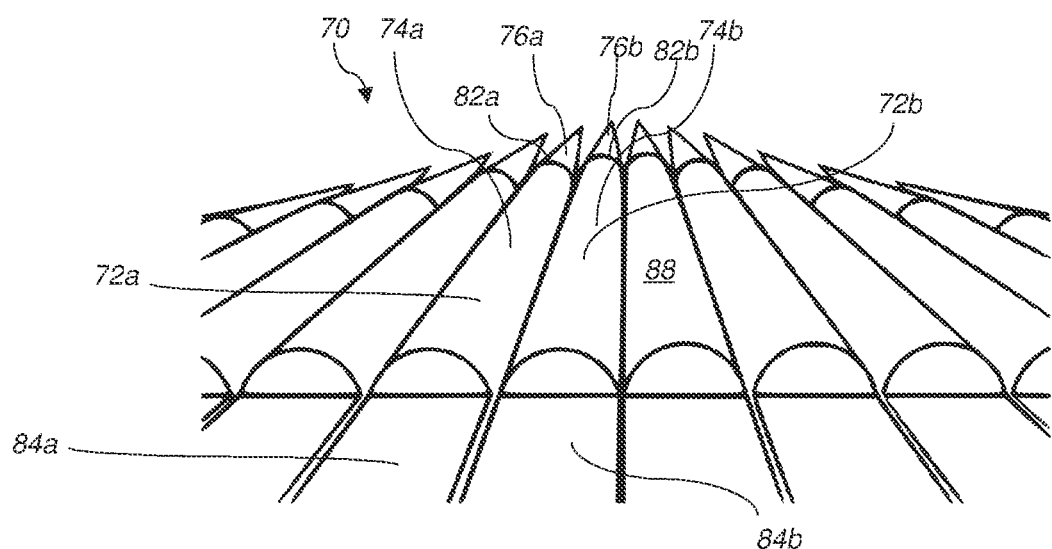
FIG. 9 is a partial perspective view of a noise reducer according to one embodiment of the present invention.

As also seen in FIG. 6, each spine member comprises a proximal end 78 and a distal end 80, as illustrated for spine member 72b, wherein the second section 76 includes the distal end 80. As also seen FIGS. 9 and 10, the second section 76 is substantially cone-shaped. An interface 82 exists between the first section 74 and the adjacent second section 76. Preferably, each spine member 72 may further comprise a third section 84a, 84b, extending along a third part of the length of the spine member 72 and including the proximal end 78 of the spine member 72, wherein the respective third sections 84a, 84b of the aligned spine members 72a, 72b form a mounting plate 86 for mounting of the noise reducer 70 to the rotor blade. As illustrated in FIGS. 8 and 9, the third section 84 may have a substantially semi-circular or semi-elliptical cross section.

Figure 10:
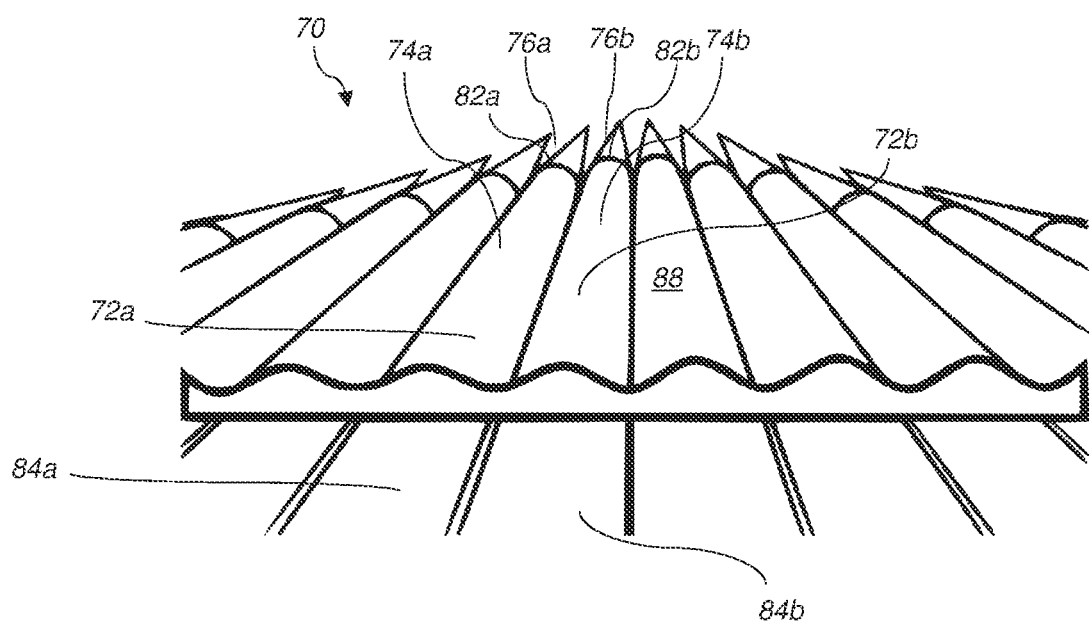
FIG. 10 is a partial perspective view of a noise reducer according to another embodiment of the present invention.

As best seen in FIGS. 9 and 10, the chordwise location of the interfaces 82a, 82b each vary between different spine members of the noise reducer. The spine members will usually be substantially aligned along the chordwise direction of the blade, as seen FIG. 2.

Figure 7:
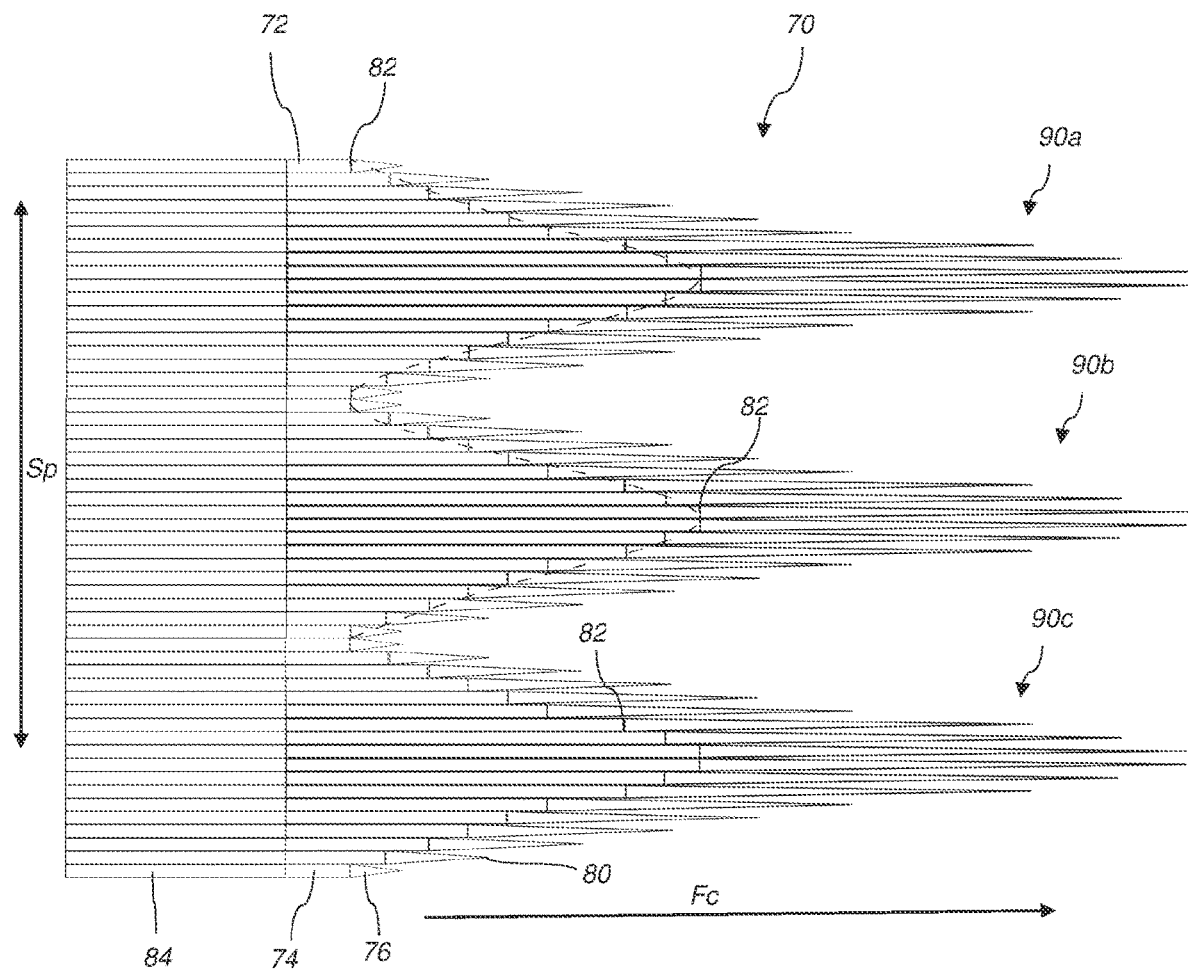
FIG. 7 shows a top view of a noise reducer according to the present invention.

FIG. 7 is a top view of a noise reducer 70 according to the present invention, comprising 54 spine members substantially aligned in a chordwise direction. When arranged on the rotor blade, air flows over the noise reducer 70 in a generally transverse or chordwise direction as indicated by arrow Fc. As indicated by the dashed curve in FIG. 7, the interfaces 82 of the plurality of spine members are arranged along an undulated, spanwise extending path across the noise reducer 70. The spanwise direction is indicated at Sp. Also, collectively the plurality of spine members 72 forms a serrated structure with serrations 90a, 90b, 90c.

As best seen in FIG. 8, the spine members 72 may have a circular or elliptical cross section at least along part of their length, in particular along their first section 74 and their second section 76. The diameter of the spine members 72 may decrease from the first section 74 to the second section 76. Thus, a diameter or thickness of the first section 74 is higher than a diameter or thickness of the second section 76.

As illustrated in FIGS. 9 and 10, adjacent spine members 72a, 72b are connected along at least part of their respective first sections 74a, 74b, preferably along their entire respective first sections 74a, 74b. By contrast, the respective second sections 76a, 76b of adjacent spine members are not connected to each other and can thus swing or resonate individually. The spine members 72 may provide a substantially ribbed or undulated surface 88 of the noise reducer 70.

The invention is not limited to the embodiments described herein and may be modified or adapted without departing from the scope of the present invention.

The invention claimed is:

1. A wind turbine rotor blade assembly comprising:
    a rotor blade having exterior surfaces defining a pressure side, a suction side, a leading edge and a trailing edge, each of the pressure side, the suction side, the leading edge and the trailing edge extending between a tip end and a root end, the rotor blade defining a span and a chord;
    a noise reducer (70) configured on the rotor blade, the noise reducer (70) comprising a plurality of aligned spine members (72), each spine member having a length and comprising:
        a first section (74) extending along a first part of the length of the spine member, and
        a second section (76) extending along a second part of the length of the spine member,
        wherein the first section (74) has a higher stiffness than the second section (76),
        wherein the first section (74) is adjacent to the second section (76) such that an interface (82) is formed between the first section (74) and the second section (76), and
        wherein a chordwise location of the interface (82) varies between different ones of the spine members (72) of the noise reducer (70).

2. The wind turbine rotor blade assembly according to claim 1, wherein each spine member comprises a proximal end (78) and a distal end (80), wherein the second section (76) includes the distal end (80).

3. The wind turbine rotor blade assembly according to claim 1, wherein the second section (76) of the spine member is formed from a material having a modulus of elasticity of 1 GPa or less.

4. The wind turbine rotor blade assembly according to claim 3, wherein the material has a modulus of elasticity of 0.1 GPa or less.

5. The wind turbine rotor blade assembly according to claim 1, wherein the second section (76) is substantially cone-shaped.

6. The wind turbine rotor blade assembly according to claim 1, wherein the interfaces (82) of the plurality of spine members (72) are arranged along an undulated, spanwise extending path across the noise reducer (70).

7. The wind turbine rotor blade assembly according to claim 1, wherein the spine members (72) of the noise reducer are arranged to form a serrated structure (90a, 90b, 90c).

8. The wind turbine rotor blade assembly according to claim 1, wherein the spine members (72) have a circular or elliptical cross section at least along part of their length.

9. The wind turbine rotor blade assembly according to claim 1, wherein a diameter or thickness of the spine members (72) decreases from the first section (74) to the second section (76).

10. The wind turbine rotor blade assembly according to claim 1, wherein a diameter or thickness of the first section (74) is higher than a diameter or thickness of the second section (76).

11. The wind turbine rotor blade assembly according to claim 1, wherein adjacent spine members (72) are connected along at least part of their respective first sections (74).

12. The wind turbine rotor blade assembly according to claim 1, wherein each of the spine members further comprises a third section (84) extending along a third part of the length of the respective spine member and including the proximal end (78) of the respective spine member, wherein the respective third sections (84) of the aligned spine members (72) form a mounting plate for mounting of the noise reducer (70) to the rotor blade.

13. A wind turbine comprising a wind turbine rotor blade assembly according to claim 1.

14. A panel for a wind turbine rotor blade, wherein the panel is configured for attachment to the wind turbine rotor blade, the panel comprising:
    a plurality of aligned spine members (72), each spine member having a length and comprising:
        a first section (74) extending along a first part of the length of the spine member, and
        a second section (76) extending along a second part of the length of the spine member, wherein the first section (74) has a higher stiffness than the second section (76), wherein the first section (74) is adjacent to the second section (76) such that an interface (82) is formed between the first section (74) and the second section (76), and wherein a chordwise location of the interface (82) varies between different ones of the spine members (72) of the noise reducer (70).

15. The panel for a wind turbine rotor blade according to claim 14, wherein the panel is configured for attachment to a trailing edge of the wind turbine rotor blade.

\* \* \* \* \*